Figure 1:
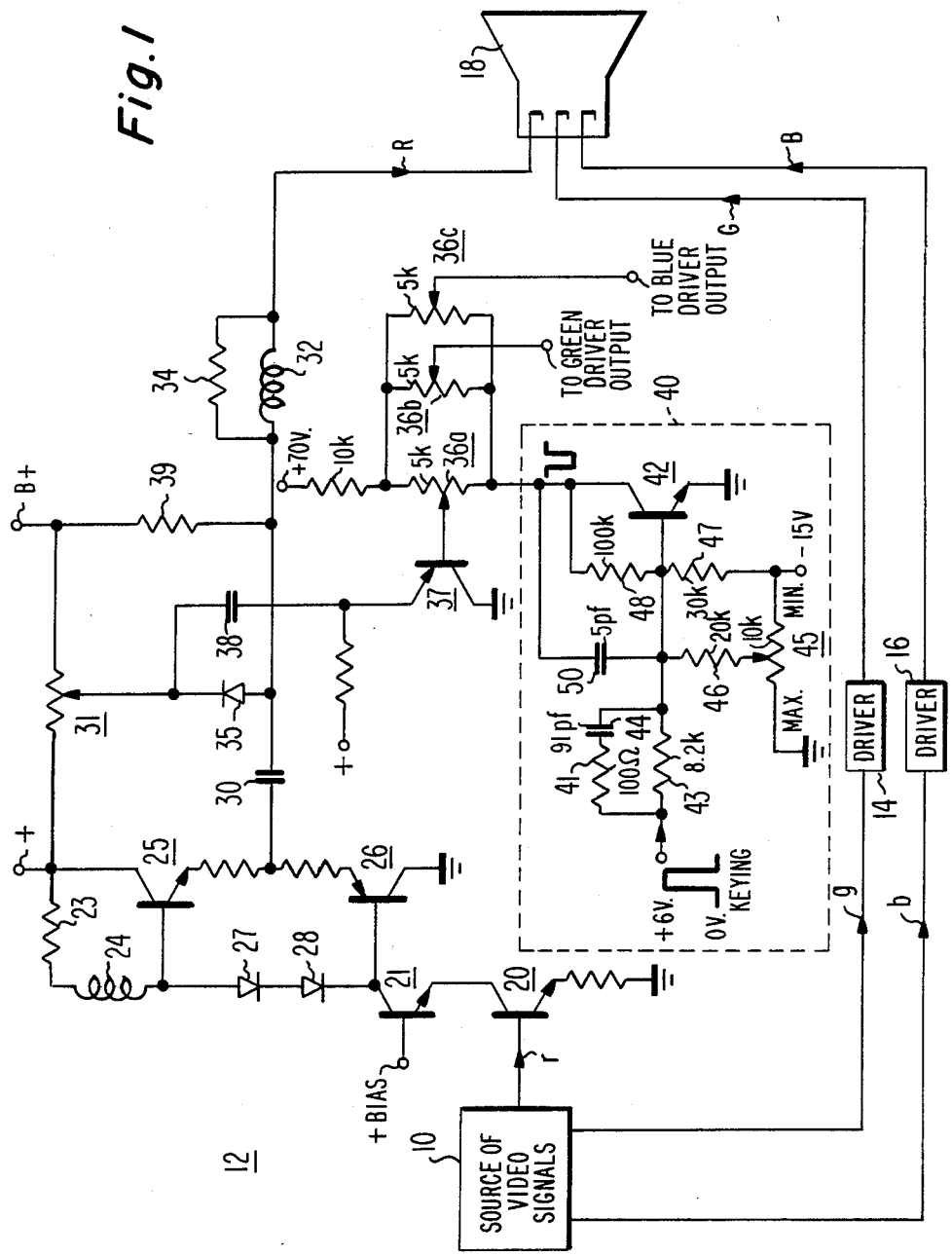

United States Patent [19]
Rodda

[11] Patent Number: 4,599,651
[45] Date of Patent: Jul. 8, 1986

[54] PULSE AMPLIFIER IN A BRIGHTNESS CONTROL SYSTEM

[75] Inventor: William E. Rodda, Mercer County, N.J.

[73] Assignee: RCA Corporation, Princeton, N.J.

[21] Appl. No.: 675,780

[22] Filed: Nov. 28, 1984

[51] Int. Cl.[4] .......................... H04N 5/57; H04N 9/20
[52] U.S. Cl. ..................................... 358/168; 358/39; 358/65
[58] Field of Search .................. 358/168, 21 R, 34, 39, 358/64, 65, 66, 74, 172, 243

[56] References Cited

U.S. PATENT DOCUMENTS

| | | | |
|---|---|---|---|
| 3,678,191 | 7/1972 | Peters et al. | 358/168 |
| 4,044,375 | 8/1977 | Norman | 358/168 |
| 4,143,398 | 3/1979 | Harwood et al. | 358/168 |
| 4,246,501 | 1/1981 | Baker | 307/300 |
| 4,285,008 | 8/1981 | Osawa et al. | 358/65 |
| 4,549,214 | 10/1985 | Hinn | 358/172 |

FOREIGN PATENT DOCUMENTS 0127439 12/1984 European Pat. Off. ............ 358/168

Primary Examiner—James J. Groody
Assistant Examiner—Randall S. Svihla
Attorney, Agent, or Firm—P. J. Rasmussen; P. M. Emanuel; R. H. Kurdyla

[57] ABSTRACT

A brightness control circuit in a video signal processing system includes an amplifier and an adjustable brightness control coupled to the amplifier input, which also receives keying pulses via a resistor-capacitor input circuit. Output pulses from the amplifier exhibit a brightness determinative amplitude related to the setting of the brightness control. To maintain a substantially constant waveshape for the output pulses as the brightness control is adjusted, a shaping capacitor is coupled between the input and output of the amplifier.

8 Claims, 2 Drawing Figures

PULSE AMPLIFIER IN A BRIGHTNESS CONTROL SYSTEM

This invention concerns an amplifier for developing a brightness representative variable amplitude pulse in a video signal processing and display system.

Video signal processing and display systems such as television receivers and video monitors typically include apparatus for controlling the brightness of an image reproduced by an associated display device such as a kinescope. Such brightness control apparatus can employ keyed or nonkeyed circuits of various configurations. For example, in AC coupled video signal processing systems wherein video signals are conveyed along a video signal path including an AC coupling capacitor, a keyed clamp or DC restoration circuit can be formed in conjunction with the AC coupling capacitor which acts as a charge storage device for brightness control purposes.

Brightness control clamps are typically keyed to operate during a relatively short interval, such as during the so-called "back porch" interval during each horizontal line blanking interval in a television receiver system. To assure that the charge on the storage device is properly representative of a desired brightness condition, the clamp circuit should be capable of conducting sufficient current during the limited time available when the clamp is keyed to operate. In one type of keyed clamp circuit, a keying pulse is applied to an amplifier network which includes an adjustable brightness control for varying the conduction of the amplifier when rendered conductive by the keying pulse. The amplfier is preferably a nonsaturating type so that an amplifier output pulse exhibits a variable amplitude representative of a desired level of image brightness, and is conveyed to the charge storage device to determine a corresponding brightness representative charge on the charge storage device.

With some circuits of this type the amplifier output pulse may exhibit an unacceptably slow amplitude transition. The speed of the amplitude transition can be increased by the known technique of using a speed-up capacitor in the input circuit of the amplifier. However, it has been observed that the waveshape of the output pulse can vary undesirably when the amplifier input current changes in response to the setting of an adjustable brightness control (e.g., a potentiometer) coupled to the amplifier input circuit. Changes in the waveshape of the output pulse can result in an unacceptable brightness control clamping characteristic particularly when the duration of the clamping interval is small, and are substantially prevented in accordance with the pulse amplifier arrangement disclosed herein.

In accordance with the principles of the present invention, a brightness control circuit includes an adjustable brightness control device such as a potentiometer coupled to the input of a pulse amplifier which receives keying pulses via an input circuit including a speed-up capacitance. Output pulses from the amplifier exhibit a brightness determinative amplitude related to the setting of the brightness control device. To maintain a substantially constant waveshape for the output pulses as the brightness control is adjusted, a shaping capacitance is coupled between the input and output of the amplifier. In accordance with a preferred embodiment of the invention, the value of the shaping capacitance preferably is significantly less than the value of the speed-up capacitance.

Figure 2:
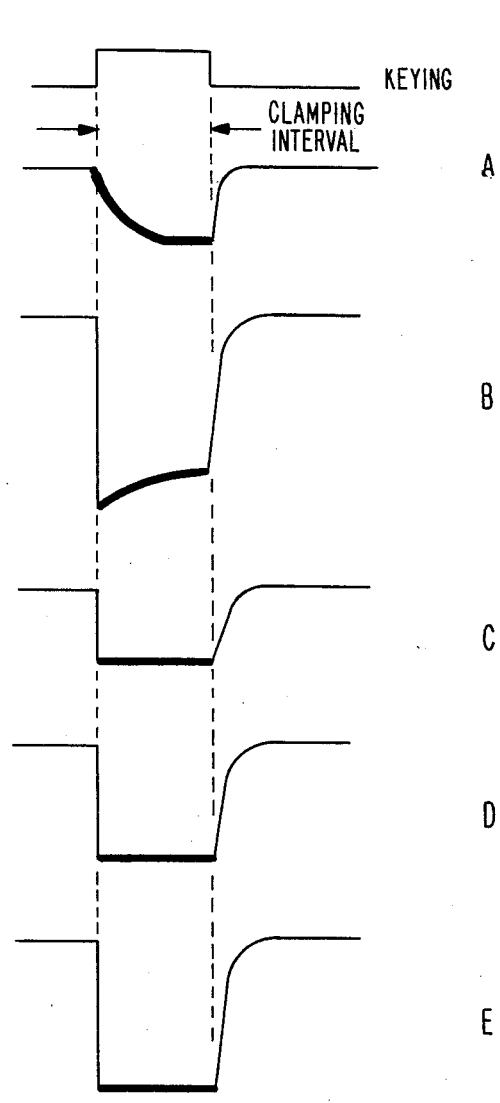

In the drawing:

FIG. 1 shows a portion of a color video monitor including a brightness control circuit with a pulse amplifier arrangement in accordance with the principles of the present invention; and FIG. 2 illustrates waveforms helpful in understanding the operation of the disclosed pulse amplifier arrangement.

In FIG. 1, low level color video signals r, g and b from a source 10 are provided to respective video output driver stages 12, 14 and 16, which supply high level amplified color video signals R, G and B to respective cathode intensity control electrodes of a color image reproducing kinescope 18. Each driver stage includes a portion of a keyed clamping circuit, as will be discussed, with the remaining portion of the clamping circuit being common to all three driver stages. Since driver stages 12, 14 and 16 are identical in structure and operation, only the circuit details of red signal driver stage 12 and the associated clamping circuit portion are shown and will be discussed.

Red color signal r is applied to the base input of an input common emitter amplifier transistor 20 which is arranged in a cascode amplifier configuration with an output common base transistor 21. The output circuit of transistor 21 includes a load resistor 23 coupled to a source of positive operating voltage (+), a high frequency peaking coil 24, complementary emitter follower output buffer transistors 25 and 26, and diodes 27 and 28 which bias transistors 25 and 26 for linear conduction. A high level amplified red color signal R is derived from the interconnected emitter circuits of transistors 25 and 26, and is conveyed to the red kinescope cathode via an AC coupling capacitor 30 and a high frequency peaking network including a peaking coil 32 and a damping resistor 34.

Associated with the red signal channel is a keyed brightness control clamping network comprising capacitor 30 together with a keyed clamping diode 35 and a pulse amplifier network 40 arranged in accordance with the principles of the present invention. Network 40 is common to output circuits of the red, blue and green video drivers.

Network 40 includes a common emitter inverting amplifier transistor 42 with a base input electrode for receiving positive keying pulses via an input circuit including a current determining resistor 43, a speed-up circuit including the series combination of a resistor 41 and a speed-up capacitor 44 shunting resistor 43, and a brightness control potentiometer 45. A suitable transistor type for transistor 42 is the MPSA42 available from Motorola. Resistor 41 serves as a current limiter with respect to positive-going edge transitions of the keying pulse as conducted by resistor 41 and capacitor 44. A resistor 46 assists to establish a desired brightness control range, and a resistor 47 establishes the base bias of transistor 42 together with a feedback resistor 48. The signal gain of the amplifier stage including transistor 42 is determined by means of feedback resistor 48 and input resistor 43. A waveform shaping capacitor 50 is coupled between the base input circuit and the collector output circuit of transistor 42 in accordance with the principles of the present invention.

Transistor 42 is normally nonconductive and is biased for nonsaturated conduction when keyed to conduct by the the keying pulse during the relatively short "back porch" interval of each horizontal line blanking interval. The input keying pulse exhibits a duration of one to two microseconds in this example. The magnitude of a negative-going clamp keying voltage pulse produced at the collector output of transistor 42 is determined by the base current of transistor 42, the magnitude of which and the conduction level of transistor 42 being related to the setting of brightness control potentiometer 45.

The pulse amplifier comprising transistor 42 is uncomplicated and economical, and exhibits predictable switching characteristics. When the keying pulse is present, the base voltage of transistor 42 is substantially fixed at approximately +0.7 volts, i.e., ground potential plus the 0.7 volt base-emitter junction offset of transistor 42, whereby the conduction of transistor 42 varies in accordance with variations of its base current. Since the emitter circuit of transistor 42 is not degenerated, maximum output voltage dynamic range is available at the collector of transistor 42.

Gain control of transistor 42 is advantageously accomplished by a DC control mechanism, wherein a wire connecting the wiper of potentiometer 45 to the base of transistor 42 does not conduct large amplitude alternating current signals which could undesirably radiate interference components capable of being picked up by other sensitive circuits of the system. In the latter regard it is noted that the connection of viewer operated potentiometer 45, which may be situated on the front panel of the monitor, to transistor 42 may entail the use of a long length of wire susceptible of radiating such interefence components.

The output clamp keying pulse from network 40 exhibits a variable amplitude related to the setting of brightness control 45, and is coupled via a pre-set brightness tracking potentiometer 36a for the red signal channel, a buffer transistor 37 and a coupling capacitor 38 to the cathode electrode of clamp diode 35. The negative-going clamp keying pulse renders clamp diode 35 conductive whereby the charge on coupling capacitor 30, and thereby the brightness of a displayed image, are modified in accordance with the peak amplitude of the clamp keying pulse. Thus, for example, increased image brightness results when the clamp keying pulse exhibits increased peak-to-peak amplitude, causing a more negative voltage to be produced at the cathode of diode 35. The plate of capacitor 30 which is coupled to the anode of diode 35 is thereby clamped to a more negative voltage, which results in a less positive DC potential at the kinescope cathode and a related increase in image brightness.

A pre-set potentiometer 31 establishes a desired bias for clamp diode 35, and a resistor 39 coupled between the kinescope cathode signal path and a high operating potential (B+) provides a DC path for clamp diode 35. Pre-set brightness tracking potentiometer 36a is adjusted during system alignment to ensure proper kinescope drive ratios and white image balance for all brightness levels. Brightness tracking potentiometers 36b and 36c serve a similar function with respect to the output circuits of the green and blue video drivers. For a given change in the setting of brightness control 45 the amplitudes of the clamp keying pulses from the wipers of potentiometers 36a, 36b and 36c vary more or less depending on the settings of these controls.

In applications requiring a clamp pulse with a fast amplitude rise time, the rise time of the transistor 42 collector current can be substantially reduced by means of speed-up capacitor 44. Capacitor 44 compensates for an otherwise unacceptably slow collector current rise time due to unavoidable small base currents which charge emitter and collector junction capacitances of transistor 42. However, and neglecting the role of capacitor 50 for the moment, it has been observed that for a given value of speed-up capacitor 44, the waveshape of the clamp keying voltage pulse at the collector of transistor 42 changes undesirably as the base current of transistor 42 is varied by means of brightness control 45. This unwanted effect is illustrated by waveforms A and B in FIG. 2.

Waveform A in FIG. 2 corresponds to a clamp keying pulse of approximately 20 volts peak-to-peak amplitude at the collector of transistor 42, produced when brightness control 45 is set to a "MIN" position (minimum brightness) corresponding to minimum conduction by transistor 42 in response to the input keying signal. Waveform B corresponds to a clamp keying pulse of approximately 40 volts peak-to-peak amplitude produced when control 45 is set to a "MAX" position (maximum brightness) for maximum conduction by transistor 42. In both cases the peak amplitude levels are not uniform over the clamping interval as defined by the keying pulse interval.

The unwanted waveshape changes noted above can lead to slower than desirable clamping action in view of the fact that the given clamping interval is short and the fact that clamp diode 35 clamps capacitor 30 to the negative-going peak amplitude excursion of the voltage pulses from transistor 42. Since in the case of both waveforms A and B the peak clamping voltage level occurs for a time which is significantly less than the total clamping interval, clamping action may be compromised since a shorter clamping interval effectively results, leading to slower, less effective clamping action.

Clamp keying pulse signals such as illustrated by waveforms A and B can lead to temporary gray scale errors in a displayed image after the brightness control is adjusted, or after a significant change in the average brightness level from one scene to another. Since a brightness clamp circuit is associated with each of the three color channels, and since the three kinescope electron guns may exhibit different conduction characteristics, a displayed image may temporarily exhibit colorimetry errors before a final brightness value is produced by the clamping circuits. Faster clamping action can be achieved by increasing the current conduction capability of the clamping circuit, but this option can prove to be too difficult or costly in many cases. Therefore, the peak amplitude of the clamp keying pulses from transistor 42 preferably should exhibit a substantially uniform level during the clamping interval, such as illustrated by clamp keying waveforms C, D and E as will be discussed.

Clamping pulses as illustrated by waveforms C, D and E desirably exhibit a substantially uniform peak level for all settings of brightness control 45. These pulse waveshapes are produced by means of shaping capacitor 50 and by choosing the value of capacitor 50 relative to the value of speed-up capacitor 44.

The value of speed-up capacitor 44 is large enough so that the leading edge of a positive-going input current pulse at the base of transistor 42 would be peaked, and so that (without capacitor 50) the leading edge of the associated negative-going output clamp keying pulse at the collector output of transistor 42 would likewise be peaked as indicated by waveform B. The value of shaping capacitor 50 is expected to be significantly less than the value of speed-up capacitor 44 in most instances, However, this relationship may vary due to circuit design factors such as the gain of the amplifier. With the values of capacitors 44 and 50 selected in this manner, the collector current of transistor 42 exhibits a fast rise time and the waveshape of the collector output clamp keying pulse remains substantially unchanged, except for peak-to-peak amplitude, for various levels of base drive current for transistor 42.

Waveforms C, D and E illustrate the waveshape of the output clamp keying pulse for various settings of brightness control 45. Waveform D exhibits a substantially uniform 30 volt peak-to-peak amplitude for a nominal mid-range setting of brightness control 45. Waveforms C and E respectively exhibit substantially uniform peak-to-peak amplitudes of 20 volts and 40 volts for MIN and MAX brightness settings of control 45. In all cases the clamp keying voltage pulses from the collector of transistor 42 permits fast, predictable clamping action during the short clamp keying interval.

The uniformity of pulse waveforms C, D and E is accomplished by means of negative current (charge) feedback via capacitor 50 from the collector output to the base input of transistor 42. Specifically, the amount of current fed back via capacitor 50, as associated with the transient peaked leading edge of the input current pulse produced by network 41, 44, is related to the voltage change per unit time (dv/dt) of the leading edge of the output voltage pulse at the collector of transistor 42. The magnitude of the output voltage pulse is a function of the setting of brightness control 45. Since the leading edge current transient which is fed back via capacitor 50 is opposite in phase to the corresponding input current transient at the base of transistor 42, and with appropriate values being selected for capacitors 44 and 50, the feedback leading edge transient current substantially cancels the input leading edge transient current via a subtractive combining process. The cancellation is not complete, however, since it is desired to produce a small residual peaked leading edge current component at the base of transistor 42 to charge the inherent base input capacitance of transistor 42, whereby the output voltage pulse at the collector of transistor 42 exhibits uniformity as shown by waveforms C, D and E. Thus capacitor 50 provides a means of maintaining a substantially constant output pulse waveshape as the base current of transistor 42 is varied via brightness control 45.

Thus as the base current is increased, the magnitude of the output clamp keying pulse increases accordingly, and the amount of oppositely phased leading edge transient current fed back by capacitor 50 increases. This effect is equivalent to that produced by decreasing the value of speed-up capacitor 44 by an amount sufficient to eliminate the leading edge peaking transient of the input pulse for a given setting of brightness control 45. Similarly, the amount of transient current fed back by capacitor 50 decreases as the magnitude of the base current decreases, producing an effect equivalent to that produced by increasing the value of speed-up capacitor 44 by an amount sufficient to maintain the desired output pulse waveshape. The amplitude of the clamp keying pulse at the collector of transistor 42 is approximately a linear function of the brightness control setting due to the negative feedback provided by resistor 48.

What is claimed is:

1. In a video signal processing and display system including a source of video signals, an image display device having an intensity control electrode, and a video signal channel for conveying video signals to said intensity control electrode, image brightness control apparatus comprising:
   a keyed video signal clamp coupled to said video channel, said clamp having a control input;
   an amplifier with an input, and an output coupled to said control input of said clamp;
   a source of keying pulses occurring during periodic video signal clamping intervals;
   an adjustable brightness control coupled to said input of said amplifier;
   an input circuit including a first capacitance and a resistance for conveying said keying pulses to said input of said amplifier, said keying pulses enabling said amplifier to produce output pulses with amplitudes in accordance with a setting of said brightness control; and
   a second capacitance coupled between said input and output of said amplifier.

2. Apparatus according to claim 1, wherein:
the value of said second capacitance is smaller than the value of said first capacitance.

3. Apparatus according to claim 1, wherein:
said first capacitance is coupled in parallel with said resistance.

4. Apparatus according to claim 3, wherein:
a feedback resistor is coupled from said output to said input of said amplifier.

5. Apparatus according to claim 1, wherein:
said amplifier is nonconductive except during said periodic video signal clamping intervals and is biased for nonsaturating operation.

6. Apparatus according to claim 5, wherein:
said amplifier comprises a transistor with a base input electrode, a collector output electrode, and a common emitter electrode coupled to a reference potential via a coupling path with substantially zero voltage offset.

7. In a video signal processing system including an image display device for displaying video information in response to video signals applied to an intensity control electrode thereof, and a video output drive amplifier, apparatus comprising:
   a capacitor for AC coupling video signals from an output of said driver amplifier to said intensity control electrode of said display device;
   switch means having a control input and being coupled to said AC coupling capacitor to form a keyed video signal clamping circuit therewith;
   an amplifier with an input, and an output coupled to said control input of said switch means;
   a source of keying pulses occurring during periodic video signal clamping intervals within video signal blanking intervals;
   an adjustable brightness control coupled to said input of said amplifier;
   an input circuit including a first capacitor in parallel with a resistor for conveying said keying pulses to said input of said amplifier, said keying pulses enabling said amplifier to produce output pulses with amplitudes in accordance with a setting of said brightness control; and
   a second capacitance, with a value smaller than the value of said first capacitance, coupled between the input and output of said amplifier.

8. Apparatus according to claim 7, wherein:
said amplifier exhibits nonsaturated operation; and
a feedback resistor is coupled from the output to the input of said amplifier.

* * * * *